United States Patent
Chen et al.

(10) Patent No.: US 9,361,342 B2
(45) Date of Patent: Jun. 7, 2016

(54) QUERY TO STREAMING DATA

(75) Inventors: Qiming Chen, Cupertino, CA (US);
Meichun Hsu, Los Altos Hills, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 795 days.

(21) Appl. No.: 13/269,627

(22) Filed: Oct. 10, 2011

(65) Prior Publication Data
US 2013/0091123 A1   Apr. 11, 2013

(51) Int. Cl.
*G06F 3/00* (2006.01)
*G06F 17/30* (2006.01)

(52) U.S. Cl.
CPC ........... *G06F 17/30516* (2013.01); *G06F 3/00* (2013.01)

(58) Field of Classification Search
CPC .......................... G06F 17/30516; G06F 13/00
USPC ................................. 707/705; 719/312, 318
See application file for complete search history.

(56) References Cited

U.S. PATENT DOCUMENTS

| | | | |
|---|---|---|---|
| 6,115,711 A * | 9/2000 | White | |
| 6,122,644 A * | 9/2000 | Graefe et al. | |
| 7,599,903 B2 | 10/2009 | Gunther et al. | |
| 7,792,784 B2 | 9/2010 | Gupta | |
| 8,433,716 B2 * | 4/2013 | Wolf et al. | 707/758 |
| 2007/0022092 A1 * | 1/2007 | Nishizawa | G06F 17/30516 |
| 2007/0112889 A1 * | 5/2007 | Cook et al. | 707/204 |
| 2008/0256146 A1 * | 10/2008 | Nishizawa et al. | 707/204 |
| 2008/0301135 A1 * | 12/2008 | Alves et al. | 707/6 |
| 2009/0106214 A1 | 4/2009 | Jain et al. | |
| 2009/0112803 A1 * | 4/2009 | Srinivasan | G06F 17/30964 |
| 2010/0138438 A1 * | 6/2010 | Torikai et al. | 707/759 |
| 2010/0250572 A1 * | 9/2010 | Chen | G06F 17/30516 707/759 |
| 2011/0016160 A1 | 1/2011 | Zhang et al. | |
| 2012/0005200 A1 * | 1/2012 | Lawrence | 707/723 |
| 2012/0079099 A1 * | 3/2012 | Dhara et al. | 709/224 |
| 2012/0109985 A1 * | 5/2012 | Chandrasekaran | 707/754 |
| 2012/0290576 A1 * | 11/2012 | Amorim | G06F 21/577 707/737 |

FOREIGN PATENT DOCUMENTS

KR   20080047681 A   5/2008

OTHER PUBLICATIONS

Lou, G. et al.; "Transaction Reordering and Grouping for Continuous Data Loading"; 2007; http://pages.cs.wisc.edu./~gangluo/tpump_workshop.pdf; On pp. 34-49.

* cited by examiner

*Primary Examiner* — Charles E Anya
(74) *Attorney, Agent, or Firm* — Trop, Pruner & Hu, P.C.

(57) ABSTRACT

A client computer buffers a continuous flow of streaming data during a sliding window that is defined by a time boundary. The client computer processes a query on a portion of the streaming data buffered during the time boundary of the sliding window and a portion of the streaming data stored in a data warehouse.

19 Claims, 3 Drawing Sheets

A client computer buffers a continuous flow of streaming data during a sliding window that is defined by a time boundary
500

↓

The client computer processes a query on a portion of the streaming data buffered during the time boundary of the sliding window and a portion of the streaming data stored in a data warehouse
510

QUERY TO STREAMING DATA

BACKGROUND

The amount of data stored in database systems has been continuously increasing over the last few decades. Database management systems manage large volumes of data that need to be efficiently accessed and manipulated. Queries to the database are becoming increasingly complex to execute in view of such massive data structures. If queries to the database are not completed in a sufficient amount of time, then acceptable performance is difficult to achieve.

Many applications are based on data being continuously collected and provided to databases. Such databases pose challenges to efficiently process and query data in a timely fashion.

DETAILED DESCRIPTION

Due to the growing data volume and the pressing need for low latency, event service has become a kind of cloud data services. Commonly, an event server (e.g., New York Stock Exchange, YAHOO™ Finance, TWITTER™, Global Positioning System servers, etc.) sends events to its subscribers on the fly, as well as stores the events in a data warehouse with certain latency. A client application retrieves real-time events or stored data when needed. Example embodiments concern how an enterprise or consumer application efficiently consumes such cloud data services, concern the consumption of the real-time event services, and extend the Data Access Object (DAO) pattern of data access applications for integrating the continuous caching and the on-demand analysis of real-time events.

Example embodiments include apparatus and methods that provide continuous access to cloud event services with event pipe queries. An event pipe caches recent events delivered by an event service and provides on-demand data analysis of event data. The event pipe is a kind of continuous query referred to as an Event Pipe Query (EPQ). This EPQ is a long-standing Structured Query Language (SQL) query with User Defined Functions (UDFs) that provide a pipe for stream data to be buffered. The streamed data continuously flows into a sliding windowed that is defined by a boundary, such as a boundary based on time or data values. When the EPQ is not requested, the EPQ maintains and updates the buffer, but does not return results. Results are returned upon receiving and processing a query on a selected part of the sliding window. Integrating event buffering and analysis in a single continuous query leverages SQL expressive power and query engine data processing to reduce data overhead and latencies associated with processing queries.

Example embodiments utilize a continuous data access object (CDAO) pattern as an extension to the data access object (DAO) pattern used in developing data access clients, for on-demand access and analysis of real-time events provided by servers, such as servers with cloud event services. The event pipe maintains the most recent events in the sliding window and analyzes events in the pipe as a construct for the CDAO. A request-and-rewind mechanism executes to provide data supply punctuation, on-demand query evaluation, and a continuous query instance. Although the EPQ runs cycle-by-cycle, the query instance does not stop and thus allows the sliding window buffer to be maintained continuously.

Example embodiments use CDAO for accessing the real-time events and the warehoused events provided by cloud data services. Since the most recent events (such as the current readings of sensors, the trading prices of a stock in the last 10 minutes, the traffic volume in the past 5 minutes, etc.) are frequently accessed by the client applications, an event access pattern is used with the cloud event service.

Figure 1:
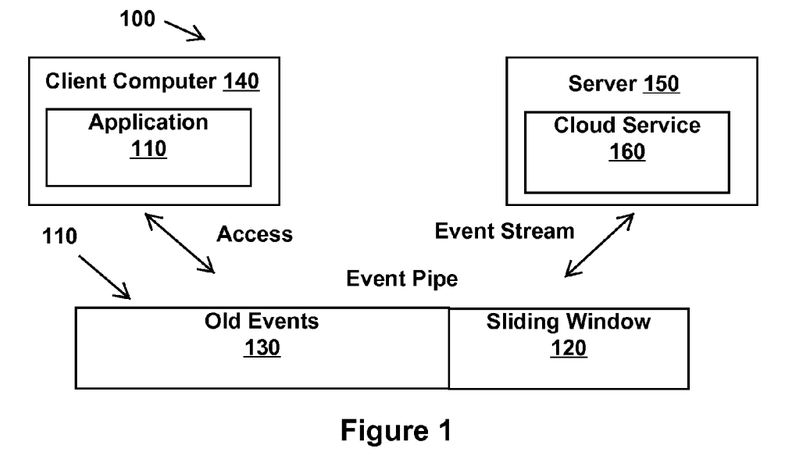
FIG. 1 shows a computer system that uses an event pipe for holding recent events falling in a sliding window in accordance with an example implementation.

FIG. 1 shows a computer system 100 that uses an event pipe 110 for holding recent events falling in a sliding window 120. The event pipe 110 shows old events 130 that are no longer buffered on a client computer 140 and recent events that are buffered on the client computer in the sliding window 120, such as a window based on time. A server 150 includes a cloud service 160 that transmits an event stream to the event pipe 110, which stores the more recent events to the sliding window 120. An application 170 executing on the client computer 140 can access the information from the event stream in the sliding window 150.

Example embodiments use an Event Pipe Query (EPQ) in order to integrate real-time event caching and analysis by the client application. An EPQ is capable of (a) piping event streams, (b) maintaining sliding window containers for the latest events, and (c) delivering sliding-window oriented analytical query results on-demand. With these capabilities, the introduction of EPQ enables integration of event caching and on-demand analysis within a single continuous Structured Query Language (SQL) query.

A CDAO contains multiple EPQs as pre-prepared stream access queries. A capability is added for merging the query results on the piped events retrieved from the cloud event service, together with the required historical events retrieved from the cloud data warehousing service. The CDAO is private to a client application.

Figure 2:
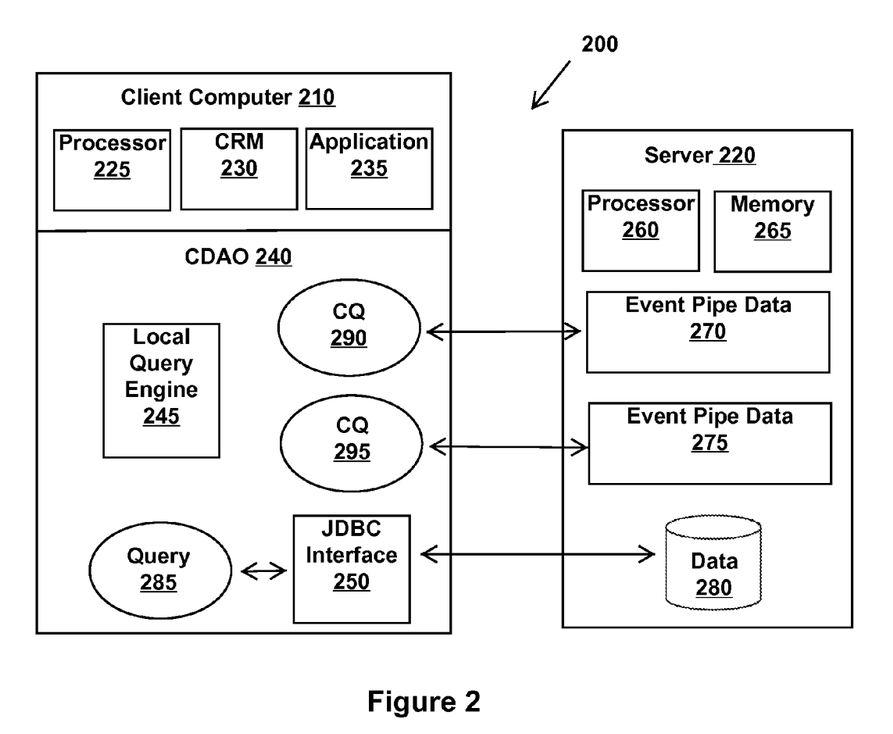
FIG. 2 shows a computer system that includes a Continuous Data Access Object (CDAO) for accessing event stream and data warehouse in accordance with an example implementation.

FIG. 2 shows a computer system 200 that includes a Continuous Data Access Object (CDAO) for accessing event stream and data warehouse.

The computer system 200 includes a client computer 210 in communication with a server 220 that includes a cloud service. The client computer includes a processor 225 in communication with memory or computer readable storage medium 230, an application 235, and a CDAO 240 having a local query engine 245 and a Java Database Connectivity (JDBC) interface 250. The server computer includes a processor 260 in communication with memory 265, event pipe data 270 and 275, and a data warehouse 280. As discussed more fully below, the CDAO 240 provides a query 285 through the JDBC interface 250 to the data warehouse 280. Continuous queries (CQ) 290 and 295 are provided to event pipes that store streaming data in a buffer or cache during a sliding window time frame.

An Event Pipe Query (EPQ) is a long-standing SQL query that continuously updates the sliding window-based event pipe. In one example embodiment, the EPQ generates a query result once requested, but returns nothing if not requested. An EPQ has three basic components.

Streaming Capture Function (SCF) that reads the events from the subscribed event source, as well as receives information request (info-req) from the application to trigger the EPQ to deliver the designated window query results.

Sliding Window Functions (SWF) that buffers the most recent events falling in a sliding window and continuously updates the buffer. Upon receipt of an information-request (e.g., an info-req passed to it from the SCF), this SWF returns the selected tuples from its buffer, as the local data source to the upstream query; otherwise it keeps updating the buffer but returns nothing.

Stream Window Query (SWQ) that applies to the result set of the above SWF and that generates query results on the event pipe once requested.

Example embodiments use a request-and-rewind mechanism to support data supply punctuation, on-demand query evaluation, and continuous query instance. Under this approach, the SCF, upon receipt of the info-req, punctuates the input data and signals the query engine to terminate and commit the current query execution, and then to rewind the query instance for serving the next request. This process ensures the continuity of the EPQ instance without being shut down and allows the sliding window content to be maintained continuously regardless of the query runs cycle-by-cycle.

The proposed EPQ approach leverages the SQL's expressive power and the query engine's data processing capability, and provides a tight integration of querying and data buffering which reduces the data movement overhead.

Example embodiments extend the open-sourced PostgreSQL query engine to support the proposed EPQ, generalize a table User Defined Function (UDF) data buffering mechanism to support SCF and SWF, and extend the query engine to handle request-and-rewind.

A discussion is now provided for data access patterns of the CDAO. While a DAO provides static data access interfaces, a CDAO adds dynamic event processing interfaces for a complex enterprise application, e.g. a J2EE application. The CDAO buffers the most recent events on the fly and analyzes these events on-demand.

The CDAO is provided with one or more event pipes as the event flow channels. Each event pipe buffers the most recent events falling in a sliding window boundary, and serves as the data container of on-demand event analytics. The events are subscribed from the cloud event service. The operational event pipes are implemented in terms of EPQs that integrate event buffering and analysis in a single query.

The events held in an EPQ are maintained and updated in real-time and on the fly. Without being requested by the application, the EPQ does not return any actual result. Upon receipt of an info-req from the application, the query operations are performed on the buffered data to return in a result.

Figure 3:
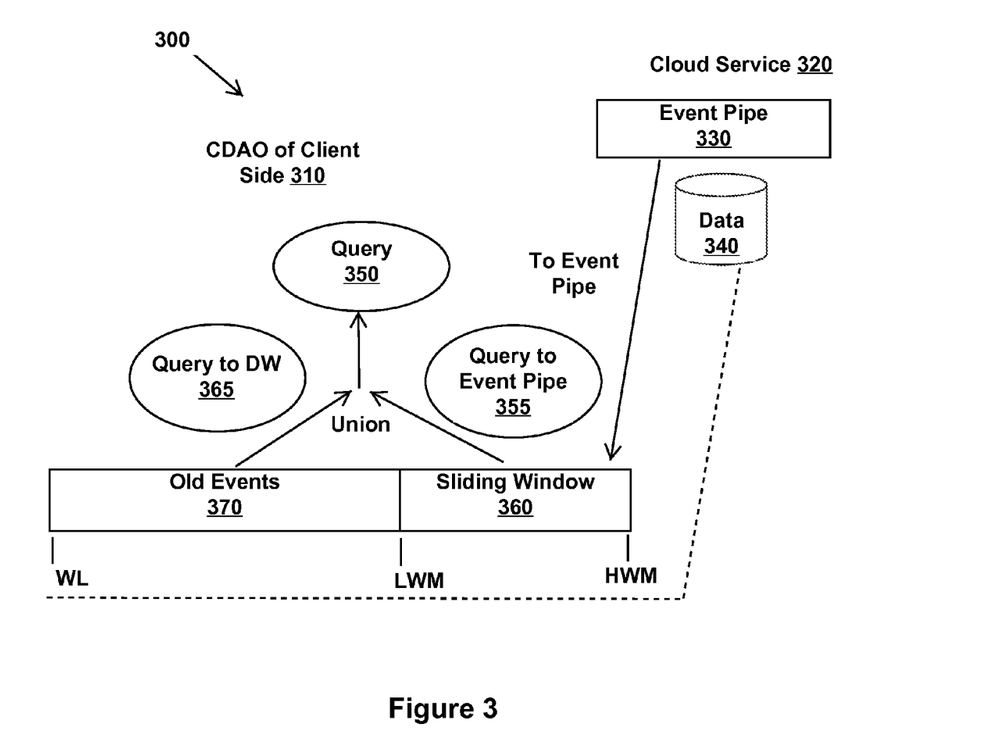
FIG. 3 shows a method for integrating stream access and data warehouse access in accordance with an example implementation.

FIG. 3 shows a method for integrating stream access and data warehouse access. The method is shown in a computer system 300 in which a CDAO of a client side 310 communicates with a cloud service 320 that includes content of the event pipe 330 and a data warehouse 340 receiving this content. In this example, the CDAO represents a client of the cloud service 320. The CDAO subscribes to the event service for providing the latest events to the client on-demand, and also subscribes to the data warehouse service where the past events are stored.

As shown in FIG. 3, a client query 350 includes both a query 355 to the sliding window 360 of the event pipe and a query 365 to the old events/data 370 stored on the data warehouse 340.

For low latency data access, the client's information request is fulfilled using the data buffered in the event pipe as the first priority. Since the most recent events are kept in the event pipe, older data, if required, are still retrieved from the data warehouse 340. In this case the CDAO of the client side 310 uses time marks to know the boundary of the data available in the data warehouse 340 and in the sliding window 360 of the event pipe.

By way of example, example embodiments utilize one or more of the following time marks:

The Water Level (WL), $t_{WL}$, of the stored events in the database table is the timestamp of the latest events that are available for accessing.

The High Water Mark (HWM), $t_{HWR}$, of the event pipe is the timestamp of the latest event in the event pipe.

The Low Water Mark (LWM), $t_{LWR}$, of the event pipe is the timestamp of the earliest event in the event pipe.

In this example, $t_{HWR} > t_{WL} > t_{LWM}$.

Then given the current timestamp t, the following occurs:

The events with timestamps later than $t_{LWR}$ can be accessed from the event pipe; in the range those earlier than $t_{WL}$ can be accessed from the data warehouse; otherwise they are accessible from either stores.

A query for accessing events in a given time range may be rewritten into two queries, one for accessing from the pipe and the other for accessing from the data warehouse; the results will be merged before returning to the caller.

As mentioned above, the content of the event pipe is continuously inserted into the data warehouse. Whenever possible the event pipe is chosen for low latency.

An enterprise application with a CDAO can have multiple modules that retrieve and analyze event data in multiple ways, and the CDAO can be provided with multiple parameterized queries for retrieving and analyzing the warehoused events, as well as multiple EPQs for retrieving and analyzing the piped, most recent events. A specific EPQ, called ID-EPQ is provided that returns the events in the given range on-demand, with a dummy query operation (i.e. just SELECT*).

The application on the client side makes a request through passing the CDAO a "query object" that contains the query ID, the time range of the queries events, and other parameters. Based on the query object, the CDAO determines which query and EPQ to use. Three example EPQ use cases are as follows:

Only the events kept in the EPQ's event pipe are requested: In this case, the CDAO sends an info-req to the EPQ as a special event (not a parameter since EPQ is a continuous query), to trigger the EPQ to deliver event analysis result on-demand.

Only the past events stored in the data warehouse are requested: In this case, the CDAO launches the corresponding query with the actual parameters extracted from the query object.

The requested events are kept in both the event table and the event pipe: In this case, the CDAO launches a query and triggers an EPQ, and a union of the two results occurs. Composing queries and merging results are rule based (e.g. union SUM and COUNT for deriving AVG). If the CDAO cannot ensure the correctness of resulting union (e.g. the query involves a UDF) the ID-EPQ will be used to merge the data at the source layer rather than at the query result layer.

In one example embodiment, the CDAO is a component of an enterprise application, rather than a public data service, such as the stock quote service provided by YAHOO™. The CDAO is private to the supported enterprise application or application suite, although the application may have multiple building blocks.

CDAO, on the client side, handles the most recent events subscribed from event services, but is not responsible for the overall event management, such as event warehousing, fault-tolerance, etc. Furthermore, the CDAO may hold multiple EPQs on the same event stream but with different query constructs expressing different event analysis functionalities, and with different sliding window coverage. An EPQ is provided with the option to continuously and automatically output events one-by-one, or by time intervals, without explicitly receiving requests from applications. The stream data "chunking criterion" is specified as a parameter of the Streaming Capture Function SCF.

An EPQ supports real-time event buffering and on-demand analysis using a continuous query model. An EPQ typically has three components for catching the events, maintaining the most recent events falling in a sliding window time range, and querying the content of the sliding window buffer on-demand. When not requested, the EPQ acts as an event flow pipe. When requested, it returns the query result on the event pipe.

For example, the EPQ for caching and delivering the most recent stock market trades may be expressed as follows:

```
SELECT (s).symbol, (s).order_type, SUM((s).volume), MAX((s).price),
MIN((s).price) FROM
    (SELECT
sliding_window_swf(1800,t.symbol,t.price,t.volume,t.order_type,t.time,
t.low,t.high) as s
        FROM stream_reader_scf ("daily_stock_exchange_stream") t
    ) sw
GROUP BY (s).symbol, (s).order_type;
The stream source, "daily_stock_exchange_stream", has attributes
        [time, symbol, price, volume, order_type]
where time is the timestamp in second, order_type can be "buy" or "sell".
```

Figure 4:
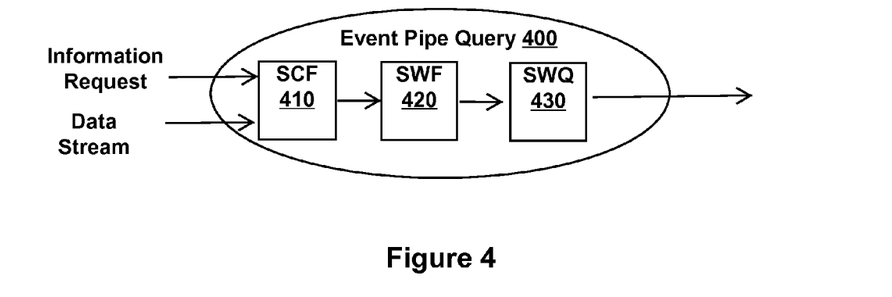
FIG. 4 shows an Event Pipe Query (EPC) with a Streaming Capture Function (SCF), a Streaming Window Function (SWF), and a Sliding Window Query (SWQ) in accordance with an example implementation.

FIG. 4 shows an Event Pipe Query (EPC) 400 with a Streaming Capture Function (SCF) 410, a Streaming Window Function (SWF) 420, and a Sliding Window Query 430.

By way of example, stream_reader_scf ( ) is a Streaming Capture Function (SCF) for (a) getting input data, and (b) receiving info-req from the application. It is a table function (i.e. a function returns a set of tuples) with result set schema [symbol, price, time, volume, order_type, low, high] where low and high mark the range of the sliding window content to be queried. When not requested, both low and high are NULL (0); when high represents the latest time, it is set to 0. For instance, <36000, 0> stands for the time period from 10 AM to now in a day; <36000, 36010> for the range from the 10:00 AM to 10:10 AM <0, 0> means not requested.

By way of example, sliding_window_swf( ) is a Sliding Window Functions (SWF) for maintaining the most recent stream elements falling in the sliding window boundary of 1800 seconds (30 minutes). This function receives data tuple-by-tuple from the SCF, stream_reader_scf( ), for maintaining and updating the sliding window state. This function is also a table function. When not requested, i.e. the values of the attributes low and high of the input tuple is NULL (0), it returns NULL; otherwise it returns tuples in the requested range with schema [symbol, price, volume, order_type, time].

By way of example, a Sliding Window Query (SWQ) applies to the tuples returned from the SWF, if any. In the above EPQ, the SWQ is applied to the result of the sub-query with alias sw (i.e. the result of the SWF), as follows:

```
SELECT (s).symbol, (s).order_type, SUM((s).volume),
MAX((s).price), MIN((s).price) FROM sw
    GROUP BY (s).symbol, (s).order_type.
```

The SWQ has no effect with NULL input, and is evaluated based on the query logic otherwise.

The notions of SCF, SWF and SWQ are more fully described as follows:

With the SCF, an EPQ is running continuously with stream data as its input. The query's access method is to receive the stream element on the fly, e.g. read from a socket or a log-file. At the bottom of a query tree, the regular table-scan is replaced by function-scan that is a kind of table function. An SCF has two input channels (not parameters). One input channel reads event data, turns them to tuples, and feeds to the SWF. The second input channel receives the info-req from the J2EE application and triggers the EPQ to deliver the designated window query results. The triggering is actually made by sending the "end-of-data" signal to the query engine to have the query engine complete the query evaluation on the sliding window content, and then rewind for other request in the next execution cycle.

The above stream punctuation, or data chunking, can also be made continuous and automatic without explicit requests from applications, for processing events one-by-one or by time intervals (e.g. minute by minute). The chunking criterion is specified as a parameter of the SCF. In the per-event (per-tuple) processing case, dividing query execution into cycles is unnecessary.

SWF is a kind of table function for buffering and continuously maintaining the latest events, or the data derived from them, falling in a sliding window boundary. In an EPQ, the SWF is the actual data source of the SWQ operation. It acts in the following way:

It continuously maintains and updates the sliding window buffer by appending new elements and removing the older ones.

The info-req received by the SCF is embedded into the next tuple feed in the SWF.

When not requested it returns NULL resulting in no data fed into the SWQ, and no result is returned from the EPQ. The EPQ provides a pipe for the events to pass.

Once requested, the current sliding window content becomes the local data source of the SWQ. As mentioned above, the current query execution will be completed with result returned. However, since the query instance is just rewound without shutting down, the buffered events will not be lost.

SWQ is used for data analysis, while SCF is used for data capturing and SWF for data buffering. SWQ is a continuous query operation defined on the results of the sub-query, i.e. the result returned from the SWF. As indicated above, the SWQ is evaluated continuously as far as the EPQ execution is not terminated. Without info-req, the SWQ behaves like a dummy function since there is no input from SWF. When an info-req from the application is passed through the SCF to the SWF, the SWF returns the selected events to feed into the SWQ.

The query results of an EPQ are generated on-demand and on the events kept in the event pipe. After receiving the info-req, the incoming event stream to the buffer is cut to allow the query to apply to the existing content of the buffer. Next, the query execution is completed and terminated in a regular way, in order to return query result. Then, the query instance is kept alive for holding the sliding window state continuously across requests, but rewound for processing the next request.

Example embodiments use an EPQ execution model, referred to as the request-rewind model. Based on this model, the EPQ does not return any result without being requested, but upon receipt of an info-req by the SCF, that info-req is embedded into the next event tuple passed to the SWF to instruct the SWF to return the buffered events for the SWQ to process. The SCF also signifies the query engine with "end-of-data" to allow the current cycle of query evaluation to commit and to terminate in the regular way, thus making the query results accessible. After that, the EPQ instance rewinds but is kept alive. During this process, the input events are continuously received and buffered by the SCF; after this process, these events are piped into the SWF. This mechanism allows the EPQ to apply the query to the event pipe on-demand, rewind for serving the next request, and keep a live instance for retaining the event pipe content.

Conceptually, an EPQ is an object with $<S, Q, f_e, f_q>$ where
S is the state of a sliding window buffer object which we call event pipe;
Q is a query object as described by the SWQ construct above;
$f_e$: $<S, e> \rightarrow S$ is a core function for maintaining the sliding window buffer; upon receipt of an event e, it updates the state S;
$f_q$: $<S, r> \rightarrow Q(S)$ is a core function that, upon receipt of a request r, applies Q to S, i.e. applies the SWQ to the content held in the sliding window buffer.

Note that S and Q are themselves objects with their own constructs (e.g. S is a subclass of a queue object with a time boundary).

Besides the above explicit semantics, the following are implied:
$f_e$: $<S, e> \rightarrow S$ has no side effect to the SWQ query operation (if not requested). This expresses the semantics that without a request the EPQ serves as the event pipe to continuously buffer the events that flow.
$f_q$: $<S, r> \rightarrow Q(S)$ has no side effect to the state of the event pipe. This expresses the semantics that once requested, a query result on the buffered events is generated but the buffer is continuously retained without interruption. This semantics is assured by implementing EPQ as a long-standing, continuous query, and by the request-rewind mechanism for keeping the query instance alive all the time.

The proposed EPQ approach supports all the above semantic features using a single continuous query that leverages the SQL expressive power and the query engines data processing capability. This approach provides a tight integration of querying and data buffering that reduces the data movement overhead in serving continuous query results.

To support the proposed EPQ, the query engine and the UDF framework are extended for handling SCF, SWF, and the on-demand query execution. One example embodiment starts with providing unbounded relation data to feed queries continuously. The first step is to replace the database table, which contains a set of tuples on disk, by the table function Stream Capture Function (SCF) that returns a sequence of tuples without first storing them on disk. An SCF can listen or read a data/event sequence and generate stream elements. An info-req from the application, as a particular event, instructs the SCF to signal end-of-data to the query engine to commit and terminate the current query execution and deliver the query result on-demand.

Conventionally, a table function first materializes its result set and then sends its content to the upstream query tuple-by-tuple. For streaming purpose, example embodiments eliminate the materialization phase of SCF.

The function scan is supported at two levels, the SCF level and the query executor level. A data structure containing the function call information bridges these two levels and is initiated by the query executor and passed to the SCF for exchanging function invocation related information. This mechanism minimizes the code change while maximizing the extensibility of the query engine.

As described earlier, a Sliding Window Function (SWF) buffers the events across multiple input tuples, and returns a set of tuples on demand.

The current generation of SQL systems offers scalar, aggregate and table functions as UDFs. The input of a scalar or table function is bound to the attribute values of a single tuple, where an aggregate function is actually evaluated incrementally tuple-by-tuple. A scalar or aggregate function can maintain a data buffer across multiple input tuple, but since it cannot return a set out of a single input, it is not suitable for our purpose. Instead, the table function with set return is used. However, a table function cannot buffer data across multiple input tuples, and therefore it is extended to satisfy the requirements for SWF.

The extension uses UDF buffer management. A SQL query is evaluated tuple-by-tuple on its input, and therefore a function, including a UDF, is called multiple times by the host query. Accordingly, a UDF is optionally coded with three code sections: the init-section, the regular-section and the final-section. The data buffer and the application state are initiated in the first call of the function, which can be retained across multiple calls; the regular-section deals with the application logic; the final-section is executed last for cleanup purpose. This is called the multi-call cycle.

The multi-call cycles of a scalar/aggregate function and of a table function are different—the former spans all the input tuples; the latter is associated with the multiple returns out of one input tuple, which means a table function lacks the capability of buffering data across multiple input tuples. The query engine and UDF framework are extended as the technical backbone to allow a table UDF to retain a data buffer across input tuples.

The top-level memory context of a table function is local to one input tuple. To buffer multiple input data, an additional level of memory context, or buffer type, is provided. With such an extension, three types of states can be maintained during the query processing:

(1) the state relating to the function invocations throughout the query, i.e. wrt all the input tuples;
(2) the state relating to processing one input tuple which may involve multiple calls to deliver multiple returns; and
(3) the state relating to the handling of one return tuple.

The query executor is extended to support these memory contexts. The extension starts from the function node in the query tree and then goes to the system handles for managing function invocation. New data structures and switching mechanisms are added for extending buffers. Accordingly new APIs for creating data buffer for each of these three contexts are implemented. In general, the buffers of a UDF at all levels are linked to the system handle for function invocation, and accessible through system APIs.

Further, since the EPQ instance continues to be alive and does not shut down, the SWF buffer can be retained continuously across the EPQ execution cycles.

The query engine is extended to support the request-and-rewind feature. An EPQ buffers the most recent events falling in a sliding window, and acts as a dataflow pipe no matter the contents of the sliding windows are queried or not. The query results are generated on demand.

With regard to the request, when a client requests the real-time events or event processing results, it sends an info-req to the SCF, which has the following effects. First, the request is embedded in the next event fed to the SWF, to instruct it to return the requested events from the event pipe, to be evaluated by the SWQ. Second, the SCF signals end-of-data to the query engine through setting a flag on the function call handle. This results in the completion and termination of the current query execution cycle in the regular way, and allows the query results to be accessible.

With regard to the rewind, upon termination of an SWQ execution cycle, the query engine does not shut down the query instance but rewinds it for continuously piping events and serving requests. During termination-rewind period, the upcoming events, if any, are buffered by the SCF to be processed in the next cycle.

Rewinding a query is a top-down process along the query plan instance tree, with specific treatment on each node type. In general, the intermediate results of the standard SQL operators (associated with the current chunk of data) are discarded but the application context kept in the SWF is retained. The query will not be re-parsed, re-planned, or re-initiated.

Rewinding the query plan instance aims to pipe new events and to serve new request, rather than re-deliver the current query result. Rewinding the query plan is different from rewinding a query cursor for re-delivering the current result set from the beginning. The proposed request-rewind approach has the ability to keep the continuity of the query instance over the entire stream, and therefore to integrate sliding window based stream buffering and querying for low latency analysis.

To illustrate how the streaming data and the warehoused data are queried in combination through CDAO, consider an application request for the summary of stock market trades, with parameters $<Q_a, t_1, t_2>$ where $Q_a$ is treated as an "abstract query" to be applied to the data in the time range of $<t_1, t_2>$.

```
[Abstract Query: Q_a]
    SELECT (s).symbol, (s).order_type, SUM((s).volume),
    MAX((s).price), MIN((s).price)
        FROM daily_stock_exchange
        GROUP BY (s).symbol, (s).order_type;
``` where "daily_stock_exchange" is an "abstract data source" that can be specialized to the stored table, "daily_stock_exchange_table", and the event pipe, "daily_stock_exchange_stream". For simplicity, we count the timestamps for the current day starting from 0 (second) at 0:00 AM. The event pipe keeps the transactions in the latest 30 minutes. We also assume the events loaded to the table are made accessible within 10 minutes; then the event table and the event type have overlapped coverage.

In this example, the request is given at 10:30 AM, for the stock market summary from 9:00 AM to the current time. Based on the above settings, the CDAO specializes the abstract query, $Q_a$, as follows. First, it launches a "table query" for retrieving the stored events with timestamps from 9:00 AM to 10:15 AM. Second, it sends an info-req to the corresponding EPQ to trigger it to deliver the event processing result in the time range from 10:15 AM to now. The "table query" is listed below.

```
[Table Query: Q_tb]
    SELECT (s).symbol, (s).order_type, SUM((s).volume),
    MAX((s).price), MIN((s).price)
        FROM daily_stock_exchange_table
        where time >= 32400        /* starting from 9:00AM */
        and time < 36900           /* to 10:15AM */
        GROUP BY (s).symbol, (s).order_type.
```

Note that the time range (from 10:15 to now) is not a parameter of the query (since the query is continuously running). Instead, this parameter is read-in by the SCF, "stream_reader_scf( )" as a special event.

```
[EPQ: Q_epq]
SELECT (s).symbol, (s).order_type, SUM((s).volume), MAX((s).price),
MIN((s).price) FROM
    (SELECT
sliding_window_swf(1800,t.symbol,t.price,t.volume,t.order_type,
t.time,t.low,t.high) as s
        FROM stream_reader_scf ("daily_stock_exchange_stream") t
    ) sw
GROUP BY (s).symbol, (s).order_type.
```

Figure 5:
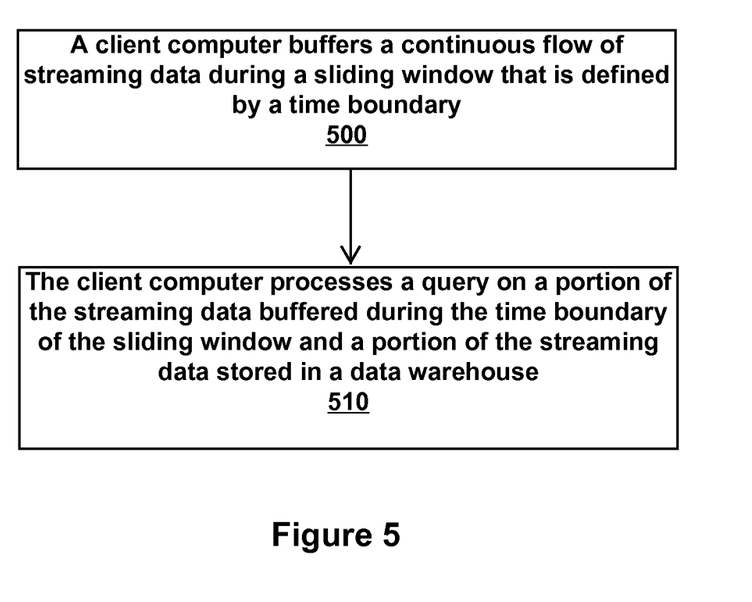
FIG. 5 shows a method in accordance with an example implementation.

FIG. 5 shows a method in accordance with an example implementation.

According to block 500, a client computer buffers a continuous flow of streaming data during a sliding window that is defined by a time boundary.

According to block 510, the client computer processes a query on a portion of the streaming data buffered during the time boundary of the sliding window and a portion of the streaming data stored in a data warehouse.

As used herein and in the claims, the following words are defined as follows:

The term "continuous query" is a registered query that is continuously and/or repeatedly triggered.

The term "database" means records or data stored in a computer system such that a computer program or person using a query language can send and/or retrieve records and data from the database.

The term "Structured Query Language" or "SQL" is a database computer language that retrieves and manages data in a relational database management systems (RDBMS), database schema creation and modification, and database object access control management. SQL provides a language for an administrator or computer to query and modifying data stored in a database.

The term "stream" is a time varying data sequence. For example, a stream can be a continuous sequence of (tuple, timestamp) pairs, where the timestamp defines an order over the tuples in the stream.

The term "query engine" is a component of a database management system that is used to evaluate queries (e.g., SQL queries) to generate responses or answers to the queries.

The term "User Defined Functions" or "UDF" is a function in a program that provides a mechanism for extending the functionality of a database server by adding a function that can be evaluated in SQL statements.

Blocks discussed herein can be automated and executed by a computer or electronic device. The term "automated" means controlled operation of an apparatus, system, and/or process using computers and/or mechanical/electrical devices without the necessity of human intervention, observation, effort, and/or decision.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

What is claimed is:

1. A method, comprising:
    buffering, on a client computer, a continuous flow of streaming data during a sliding window that is defined by a time boundary;
    storing a portion of the streaming data in a data warehouse, wherein the stored portion includes older streaming data that was previously buffered on the client computer and has expired from the sliding window;
    receiving, by the client computer, an information request query, wherein the information request query specifies an abstract data source that represents the streaming data buffered on the client computer during the sliding window and the portion of the streaming data stored in the data warehouse;
    retrieving, by the client computer, at least some of the streaming data buffered on the client computer and at least some of the portion of the streaming data stored in the data warehouse; and
    executing, by the client computer, the information request query to generate query results based on the retrieved at least some of the streaming data buffered on the client computer and at least some of the portion of the streaming data stored in the data warehouse.

2. The method of claim 1 further comprising, continuously updating the streaming data buffered during the time boundary of the sliding window even when no query is pending for the streaming data.

3. The method of claim 1 further comprising, accessing the streaming data buffered in an event pipe during the time boundary of the sliding window and in the data warehouse after expiration of the time boundary.

4. The method of claim 1 further comprising:
    storing the streaming data in an event pipe;
    analyzing events in the event pipe based on a continuous data access object (CDAO) pattern.

5. The method of claim 1 wherein buffering the streaming data comprises continuously executing an event pipe query, wherein the event pipe query includes a stream capture function (SCF) that captures the streaming data from a particular stream source.

6. The method of claim 1, further comprising:
    processing, by the client computer, the information request query using a particular portion of the abstract data source, wherein the particular portion of the abstract data source is selected based on a time value associated with the information request query.

7. A non-transitory computer readable storage medium comprising instructions that when executed causes a computer system to:
    receive, by a client computer from a server, continuous streaming data to an event pipe;
    buffer, in the client computer, the streaming data in the event pipe during a time period defined by a sliding window;
    store, in a data warehouse, a portion of the streaming data, wherein the stored portion includes older streaming data that was previously buffered on the client device and has expired from the sliding window;
    a receive an information request query at the client computer, wherein the information request query specifies an abstract data source that represents the streaming data buffered in the client computer and the portion of the streaming data stored in the data warehouse;
    retrieving, by the client computer, at least some of the streaming data buffered on the client computer and at least some of the portion of the streaming data stored in the data warehouse; and
    executing, by the client computer, the information request query to generate query results based on the retrieved at least some of the streaming data buffered on the client computer and at least some of the portion of the streaming data stored in the data warehouse.

8. The non-transitory computer readable storage medium of claim 7 including instructions to further cause the computer system to:
    select, based on the time value associated with the information request query, the at least some of the streaming data buffered on the client computer and the at least some of the portion of the streaming data stored in the data warehouse.

9. The non-transitory computer readable storage medium of claim 7 including instructions to further cause the computer system to:
    execute a continuous data access object (CDAO) for merging query results from events retrieved from the event pipe and query results retrieved from the data warehouse.

10. The non-transitory computer readable storage medium of claim 7 including instructions to further cause the computer system to:
    execute a Streaming Capture Function (SCF) that receives an information-request, signals a query engine to terminate and commit a current query execution, and rewinds a query instance for serving a next query request.

11. The non-transitory computer readable storage medium of claim 7 including instructions to further cause the computer system to:

execute a continuous data access object (CDAO) with plural event pipes implemented in terms of Event Pipe Queries (EPQs) that integrate event buffering and analysis in a single query.

12. The non-transitory computer readable storage medium of claim 7 including instructions to further cause the computer system to:
   execute, by the client computer, the information request query using a particular portion of the abstract data source, wherein the particular portion of the abstract data source is selected based on a time value associated with the information request query.

13. A computer system, comprising:
   a memory storing instructions; and
   a processor executing the instructions to:
      buffer streaming data in an event pipe on the computer system during a time boundary defined by a sliding window,
      store a portion of the streaming data in a data warehouse, wherein the stored portion includes older streaming data that was previously buffered on the client device and has expired from the sliding window;
      receive an information request query at the computer system, wherein the information request query specifies an abstract data source that represents the streaming data buffered in the event pipe on the client computer and the portion of the streaming data stored in the data warehouse;
   retrieve at least some of the streaming data buffered on the client computer and at least some of the portion of the streaming data stored in the data warehouse; and
   execute the information request query to generate query results based on the retrieved at least some of the streaming data buffered on the client computer and at least some of the portion of the streaming data stored in the data warehouse.

14. The computer system of claim 13 wherein the processor further executes the instructions to use time marks to know a location of data available in the event pipe and a location of data available in the data warehouse.

15. The computer system of claim 13 further comprising a continuous data access object (CDAO) executing on a client computer, wherein the CDAO includes multiple Event Pipe Queries (EPQs) on a same event stream but with different query constructs expressing different event analysis functionalities and with different sliding window coverage.

16. The computer system of claim 13 wherein the processor further executes the instructions to cache events in the event pipe, maintain most recent events in the event pipe while the events fall in the time boundary defined by the sliding window, and query content of the event pipe on-demand.

17. The computer system of claim 13 wherein the processor further executes the instructions to continuously maintain and update the streaming data in the event pipe by appending new elements and removing the older ones.

18. The computer system of claim 13 wherein the processor further executes the instructions to continuously execute an event pipe query, wherein the event pipe query includes a stream capture function (SCF) that captures the streaming data from a particular stream source.

19. The computer system of claim 18 wherein the processor further executes the instructions to:
   execute the information request query using a particular portion of the abstract data source, wherein the particular portion of the abstract data source is selected based on a time value associated with the information request query.

* * * * *